United States Patent
Liao

(10) Patent No.: US 8,270,672 B2
(45) Date of Patent: Sep. 18, 2012

(54) DISPLAY ANGLE ADJUSTMENT SYSTEM AND METHOD THEREOF

(75) Inventor: Ming-Yang Liao, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 415 days.

(21) Appl. No.: 12/755,531

(22) Filed: Apr. 7, 2010

(65) Prior Publication Data

US 2011/0158466 A1    Jun. 30, 2011

(30) Foreign Application Priority Data

Dec. 30, 2009   (TW) ................................ 98145863 A

(51) Int. Cl.
*G06K 9/00* (2006.01)

(52) U.S. Cl. ........ 382/103; 382/118; 382/190; 382/197; 345/156

(58) Field of Classification Search ................. 382/103, 382/117, 118, 190, 197; 345/156
See application file for complete search history.

(56) References Cited

U.S. PATENT DOCUMENTS

| | | | | |
|---|---|---|---|---|
| 5,250,888 A | * | 10/1993 | Yu | 318/640 |
| 5,349,379 A | * | 9/1994 | Eichenlaub | 348/59 |
| 5,574,836 A | * | 11/1996 | Broemmelsiek | 345/427 |
| 6,348,928 B1 | * | 2/2002 | Jeong | 345/649 |
| 6,580,952 B2 | * | 6/2003 | Fukuda et al. | 700/83 |
| 6,931,596 B2 | * | 8/2005 | Gutta et al. | 715/728 |
| 7,023,499 B2 | * | 4/2006 | Williams et al. | 348/836 |
| 7,436,140 B2 | * | 10/2008 | Takaji et al. | 318/466 |
| 7,643,275 B2 | * | 1/2010 | Williams et al. | 361/679.05 |
| 7,898,429 B2 | * | 3/2011 | Hwang et al. | 340/686.1 |
| 8,081,432 B2 | * | 12/2011 | Li et al. | 361/679.06 |
| 8,098,981 B2 | * | 1/2012 | Seo et al. | 396/50 |
| 8,115,877 B2 | * | 2/2012 | Blatchley et al. | 348/836 |
| 2006/0071135 A1 | * | 4/2006 | Trovato | 248/289.11 |
| 2009/0295832 A1 | * | 12/2009 | Takatsuka et al. | 345/659 |
| 2010/0185990 A1 | * | 7/2010 | Ha et al. | 715/863 |
| 2012/0019438 A1 | * | 1/2012 | Liao | 345/156 |

* cited by examiner

*Primary Examiner* — Aaron W Carter
(74) *Attorney, Agent, or Firm* — Altis Law Group, Inc.

(57) ABSTRACT

A display angle adjustment system includes a display rotation module, an image capture module, a data processing module, and a control module. The display rotation module is configured for driving the display to move. The image capture module is rotatably positioned on the display. The data processing module is electrically connected to the image capture module, for receiving a signal including image information from the image capture module, and calculating an eigenvector using a plurality of feature points according to the signal. The control module is electrically connected to the display rotation module, the image capture module, and the data processing module, respectively, for controlling the display rotation module and the image capture module to rotate according to the eigenvector calculated by the data processing module.

13 Claims, 3 Drawing Sheets

DISPLAY ANGLE ADJUSTMENT SYSTEM AND METHOD THEREOF

BACKGROUND

1. Technical Field

The present disclosure relates generally to display angle adjustment and, more particularly, to a display angle adjustment system and method used in a notebook computer.

2. Description of Related Art

Presently, notebook computers are widely used due to their ease of transport. A commonly used notebook computer generally includes a main body with a keyboard and a cover with a display. The cover is hinged on the main body. In use, manual realignment of the cover is required to adjust a visual angle of the display.

However, if the viewing position changes, additional realignment is necessary, thereby impacting convenience of use.

Therefore, there is room for improvement within the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
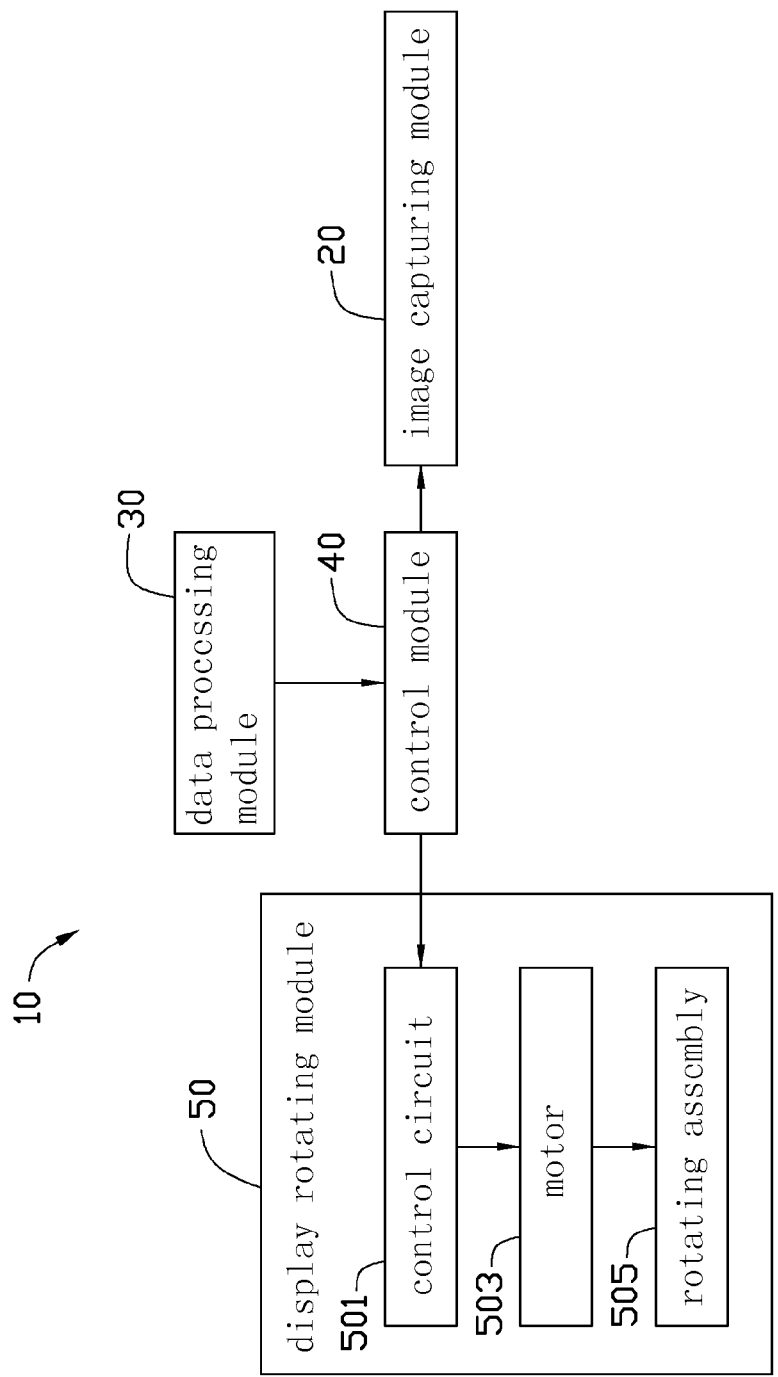
FIG. 1 is a schematic view of an embodiment of a display angle adjustment system.

Referring to FIG. 1, an embodiment of a display angle adjustment system 10 used in a notebook computer includes an image capture module 20, a data processing module 30, a control module 40, and a display rotation module 50. The image capture module 20 is rotatably positioned on a display of the notebook computer. In the illustrated embodiment, the image capture module 20 is a webcam. In addition, the image capture module 20 can share the same rotation direction as the display.

The data processing module 30 is electrically connected to the image capture module 20, receiving one or more signals including image information from the image capture module 20, and calculating an eigenvector using a plurality of feature points according to the signal and the image positioning information. In the illustrated embodiment, the feature points provide reference for a user's facial features, and the feature points of the face includes the center points and edge points of various facial features. During operation, the data processing module 30 compares the original eigenvalue with the instant eigenvalues.

The control module 40 is electrically connected to the image capture module 20, the data processing module 30, and the display rotation module 50. The control module 40 receives a signal from the data processing module 30 including eigenvector information, and rotates the image capture module 20 and the display rotation module 50. The display rotation module 50 includes a control circuit 501, a motor 503, and a rotation assembly 505 of the display. The rotation assembly 505 is connected to the motor 503. In the illustrated embodiment, the rotation assembly 505 is a biaxial hinge assembly.

Figure 2A:
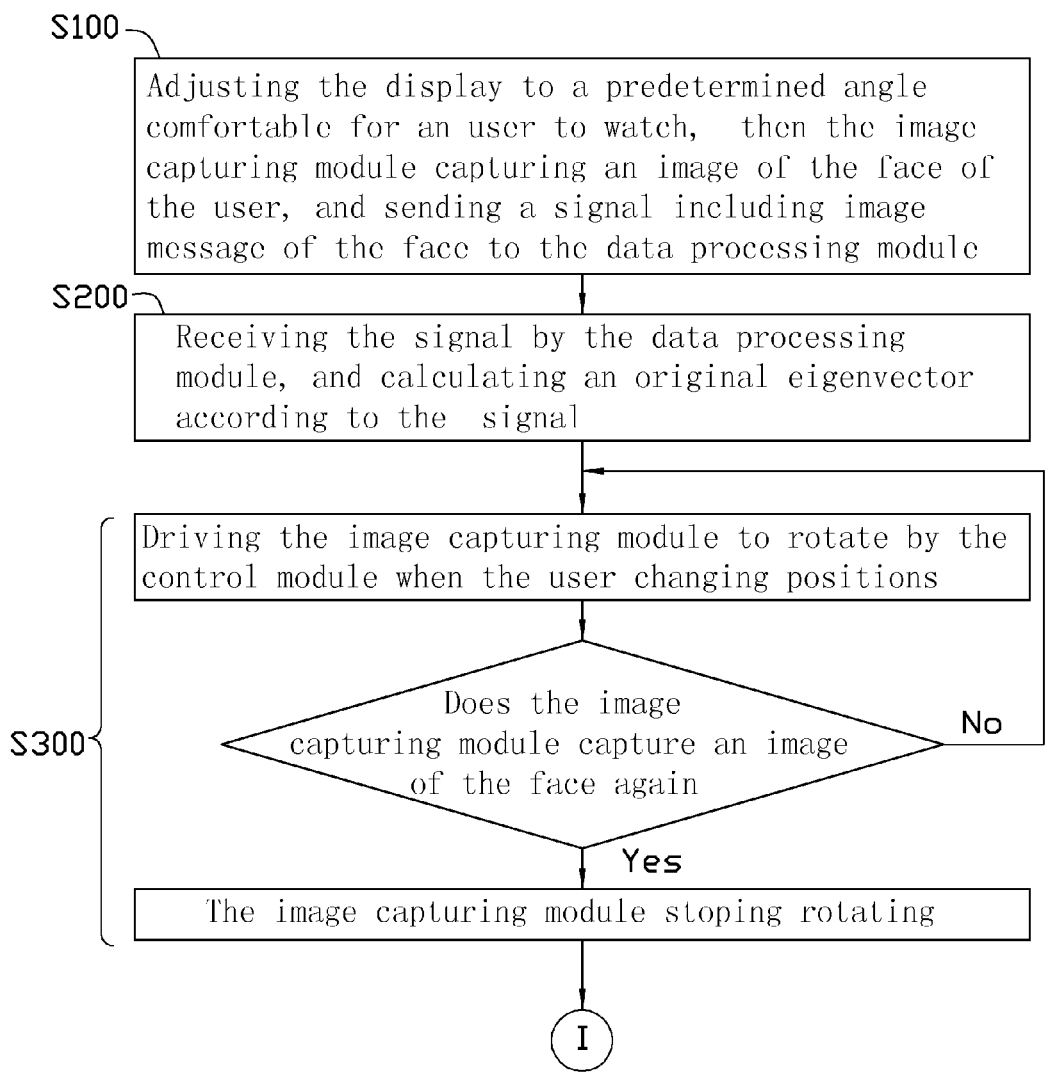
FIGS. 2A and 2B are a plurality of flowcharts of a display angle adjustment method utilizing a display angle adjustment system such as, for example, that of FIG. 1.
Figure 2B:
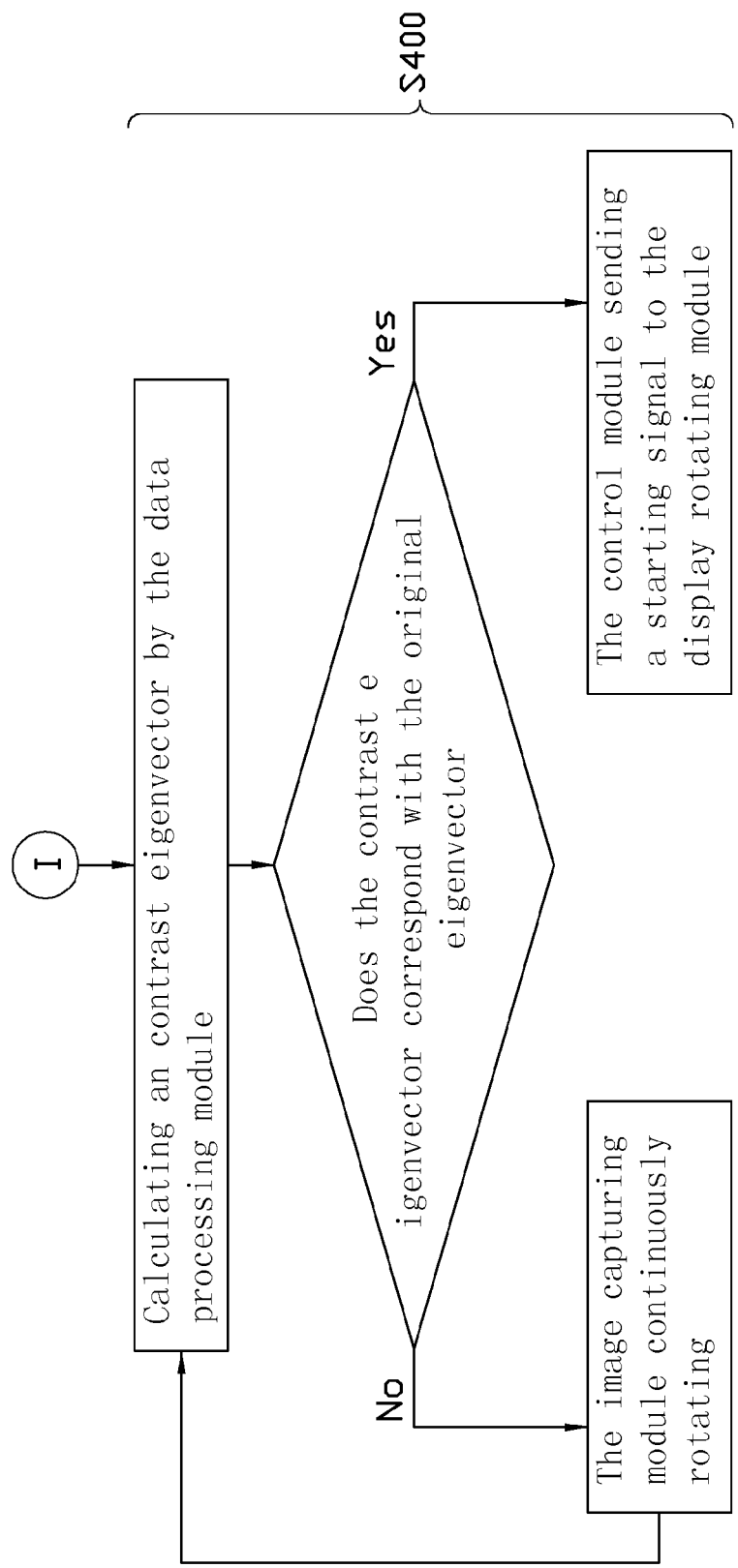

Referring to FIGS. 2A and 2B, a display angle adjustment method utilizing the display angle adjustment system 10 is as follows.

In step S100, the display is adjusted to a predetermined desired angle. The image capture module 20 is aligned with the display. Image capture module 20 captures an image of the face of the user, and sends a first signal including image information of the face to the data processing module 30.

In step S200, the data processing module 30 receives the first signal, and calculates an original eigenvector according to the first signal.

In step S300, when a position of the user changes, the control module 40 is initiated. The image capture module 20 is rotated by the control module 40, and captures another image to generate a second signal, which is sent to the data processing module 30. The data processing module 30 receives the second signal and determines whether the image capture module 20 has captured the face image of the user. If the image capture module 20 has not captured the face image of the user, the image capture module 20 continues to rotate until when the image capture module 20 has captured the face image of the user, the image capture module 20 then stops rotating and sends a third signal to the data processing module 30.

In step S400, the data processing module 30 receives the third signal and calculates a contrast eigenvector accordingly. The data processing module 30 compares the contrast eigenvector with the original eigenvector. If the contrast eigenvector does not correspond to the original eigenvector, the image capture module 20 continues to rotate while controlled by the control module 40, in order to capture an image of the face. If the contrast eigenvector corresponds to the original eigenvector, the control module 40 sends a starting signal to the control circuit 501 of the display rotation module 50. The control circuit 501 drives the motor 503 to rotate, such that the rotation assembly 505 is rotated by the motor 503 to adjust the display angle relative to the user, until the image capture module 20 is aligned with the display again. During the process of performing the display angle adjustments, the image capture module 20 remains locked on the face image of the user, until the image capture module 20 corresponding to the display are returned to their original position. The display can be viewed from the predetermined angle again.

Display angle can be realigned by the angle adjustment system 10 automatically, increasing efficiency and ease of use.

It should be pointed out that the display angle adjustment system 10 can be used in other electronic devices having a display, but the rotation assembly 50 should be a biaxial hinge assembly.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A display angle adjustment system, comprising:
    a display rotation module capable of moving a display;
    an image capture module rotatably positioned on the display;
    a data processing module electrically connected to the image capture module, for receiving a signal including image information from the image capture module, and calculating an eigenvector comprising a plurality of feature points according to the signal;
    a control module electrically connected to the display rotation module, the image capture module, and the data processing module, for rotating the display rotation module and the image capture module according to the eigenvector calculated by the data processing module.

2. The display angle adjustment system of claim 1, wherein the display rotation module comprises a control circuit, a motor, and a rotation assembly, the control circuit connected to the motor, and the motor connected to the rotation assembly.

3. The display angle adjustment system of claim 2, wherein the rotation assembly is a biaxial hinge assembly.

4. The display angle adjustment system of claim 1, wherein the image capture module is a webcam.

5. The display angle adjustment system of claim 1, wherein the feature points provide reference for a user's facial features.

6. A display angle adjustment method, comprising:
providing a display angle adjustment system comprising a display rotation module, an image capture module, a data processing module, and a control module, the image capture module positioned on and aligned with the display, the data processing module electrically connected to the image capture module, and the control module electrically connected to the display rotation module, the image capture module, and the data processing module;
adjusting the display to a predetermined desired angle, and the image capture module capturing an image of the face of the user and sending a first signal including the image information of the face to the data processing module;
receiving of the first signal by the data processing module, and calculating of an original eigenvector according to the first signal;
rotating the image capture module by the control module when the viewing position changes, capturing another image of the face, and the image capture module sending a second signal to the data processing module;
receiving of the second signal by the data processing module and calculating a contrast eigenvector according to the second signal including the image information of the face; and
comparing the contrast eigenvector with the original eigenvector to determine whether the display rotation module is to be initialized by the control module.

7. The display angle adjustment method of claim 6, wherein the display rotation module comprises a control circuit, a motor, and a rotation assembly, the control circuit connected to the motor, and the motor connected to the rotation assembly.

8. The display angle adjustment method of claim 7, wherein if the contrast eigenvector corresponds to the original eigenvector, the control module sends a starting signal to the control circuit of the display rotation module, the control circuit drives the motor to rotate, such that the rotation assembly is rotated by the motor to adjust the display angle relative to the user, until the image capture module is aligned with the display again.

9. The display angle adjustment method of claim 7, wherein if the contrast eigenvector does not correspond to the original eigenvector, the image capture module continues to be rotated by the control module to capture an image of the face.

10. The display angle adjustment method of claim 6, wherein the original eigenvector comprises a plurality of feature points, the feature points providing reference for a user's facial features.

11. The display angle adjustment method of claim 6, wherein the contrast eigenvector is comprised of a plurality of feature points, the feature points provide reference for a user's facial features.

12. The display angle adjustment method of claim 7, wherein the rotation assembly is a biaxial hinge assembly.

13. The display angle adjustment method of claim 6, wherein the image capture module is a webcam.

* * * * *